(12) United States Patent
Galasso et al.

(10) Patent No.: US 9,209,588 B2
(45) Date of Patent: *Dec. 8, 2015

(54) DISK LASER

(71) Applicant: The Boeing Company, Chicago, IL (US)

(72) Inventors: D. Anthony Galasso, Trabuco Canyon, CA (US); David A. Whelan, Newport Coast, CA (US); Alan Zachary Ullman, Northridge, CA (US); Dennis George Harris, Thousand Oaks, CA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/935,782

(22) Filed: Jul. 5, 2013

(65) Prior Publication Data

US 2014/0016658 A1    Jan. 16, 2014

Related U.S. Application Data

(63) Continuation of application No. 12/965,562, filed on Dec. 10, 2010, now Pat. No. 8,509,281.

(60) Provisional application No. 61/303,534, filed on Feb. 11, 2010.

(51) Int. Cl.
```
H01S 3/07      (2006.01)
H01S 3/081     (2006.01)
H01S 3/04      (2006.01)
H01S 3/14      (2006.01)
```
(Continued)

(52) U.S. Cl.
CPC .............. *H01S 3/0404* (2013.01); *F42B 10/60* (2013.01); *H01S 3/042* (2013.01); *H01S 3/0604* (2013.01);

(Continued)

(58) Field of Classification Search
CPC ..... H01S 2301/02; H01S 3/0604; H01S 3/07; H01S 3/0404
See application file for complete search history.

(56) References Cited

U.S. PATENT DOCUMENTS 7,200,161 B2 *  4/2007  Vetrovec .......................... 372/70
2002/0110164 A1 *  8/2002  Vetrovec .......................... 372/36

(Continued)

FOREIGN PATENT DOCUMENTS

EP        1231683 A2    8/2002
EP        1873875 A2    2/2008

(Continued)

OTHER PUBLICATIONS

International Search Report and Written Opinion, dated May 6, 2011, regarding Application No. PCT/US2011/020865, 15 pages.

(Continued)

*Primary Examiner* — Tod T Van Roy
*Assistant Examiner* — Marcia Golub-Miller
(74) *Attorney, Agent, or Firm* — Yee & Associates, P.C.

(57) ABSTRACT

The different advantageous embodiments provide an apparatus and method comprising a substrate configured to increase an intensity of light at a desired wavelength. The substrate has a front side, a back side, and an outer edge. The substrate is configured to reflect the light received on the front side of the substrate. The substrate comprises ceramic. The substrate comprises a plurality of sections. The method and apparatus also comprise a material configured to attenuate the light passing between the plurality of sections. The material surrounds an edge of each section of the plurality of sections. The apparatus and method also comprise a cooling system configured to allow liquid nitrogen to be transmitted through the cooling system and receive heat generated in the substrate from the back side of the substrate.

5 Claims, 12 Drawing Sheets

(51) Int. Cl.
| | |
|---|---|
| *F42B 10/60* | (2006.01) |
| *H01S 3/042* | (2006.01) |
| *H01S 3/06* | (2006.01) |
| *H01S 3/16* | (2006.01) |
| *H01S 3/23* | (2006.01) |

(52) U.S. Cl.
CPC ............... *H01S 3/07* (2013.01); *H01S 3/0407* (2013.01); *H01S 3/1685* (2013.01); *H01S 3/2316* (2013.01); *H01S 3/2333* (2013.01); *H01S 2301/02* (2013.01)

(56) References Cited

U.S. PATENT DOCUMENTS

| | | |
|---|---|---|
| 2005/0013333 A1 | 1/2005 | Kwon |
| 2005/0175057 A1* | 8/2005 | Sumida et al. ............ 372/68 |
| 2013/0163625 A1 | 6/2013 | Galasso et al. |

FOREIGN PATENT DOCUMENTS

| | | |
|---|---|---|
| WO | WO2005029656 A1 | 3/2005 |
| WO | WO2006037076 A2 | 4/2006 |
| WO | WO2006072182 A1 | 7/2006 |

OTHER PUBLICATIONS

Kawanaka et al., "42-mJ Q-switched Active-Mirror Laser Oscillator with a Cryogenic Yb:YAG Ceramics", Conference on Advanced Solid-State Photonics (ASSP), Jan. 28, 2007, 3 pages.

Kawanaka et al., "High energy, Diode-pumped Yb-doped solid-state lasers for inertial fusion drivers", Proceedings of the 2008 IEEE Leos Annual Meeting Conference, Nov. 2008, pp. 777-778.

Kawanaka et al., "New Concept for Laser Fusion Energy Driver by Using Cryogenically-Cooled Yb:YAG Ceramic", Journal of Physics: Conference Series, vol. 112, No. 3, May 2008, 4 pages.

"Boeing Fires New Thin-Disk Laser Achieving Solid-State Laser Milestone", Space Daily, dated Jun. 6, 2008, 3 pages. Accesed Nov. 16, 2010, http://www.spacewar.com/reports/Boeing_Fires_New_Thin_Disk_Laser_Achieving_Solid_State_Laser_Milestone_999.html.

"Encyclopedia of Laser Physics—Thin disk Lasers", RP Photonics, dated Jul. 2, 2010, 10 pages. Accessed Nov. 16, 2010, rp-photonics.com/thin_disk_lasers.html.

Office Action, dated Apr. 18, 2012, regarding U.S. Appl. No. 12/965,562, 11 pages.

Final Office Action, dated Aug. 17, 2012, regarding U.S Appl. No. 12/965,562, 7 pages.

Notice of Allowance, dated Apr. 10, 2013, regarding U.S. Appl. No. 12/965,562, 11 pages.

Notification of First Office Action, dated Jan. 6, 2014, regarding Application No. CN20118009373.X, 5 pages.

Notification of Second Office Action, dated Sep. 23, 2014, regarding Application No. CN20118009373.X, 13 pages.

Notification of Third Office Action, dated Apr. 7, 2015, regarding Application No. CN20118009373.X, 3 pages.

Notification of Third Office Action, dated Apr. 7, 2015, regarding Application No. CN20118009373.X, 5 pages.

\* cited by examiner

DISK LASER

This application is a continuation of U.S. application Ser. No. 12/965,562, filed Dec. 10, 2012, status pending, which claims the benefit of provisional application No. 61/303,534 both of which are incorporated herein by reference.

BACKGROUND INFORMATION

1. Field

The present disclosure relates generally to laser systems and, in particular, to a method and apparatus for laser systems using disks to reflect light. Still, more particularly, the present disclosure relates to a method and apparatus for laser systems using disks to reflect light with cryogenic cooling.

2. Background

A laser system produces a high-intensity optical, infrared, or ultraviolet radiation with photons as a result of stimulated emission maintained within a solid, liquid, or gaseous medium. The emitted light is coherent. The emitted light can be manipulated with lenses. "Coherent light" is light having in-step waves of identical frequency and phase. The beam of coherent light generated by a laser system differentiates the laser system from other light sources that emit incoherent light beams. The other light sources emit light beams that have random phase varying with time and position.

A laser system includes a gain medium that is located inside a reflective optical cavity, as well as a means to supply energy to the gain medium. The gain medium is a material with properties that allow it to amplify light by stimulated emission. A cavity has two mirrors arranged such that light bounces back and forth, each time passing through the gain medium. The cavity may have additional mirrors. Typically, one of the two mirrors is partially transparent or is physically divided into two or more optics, one of which is reflective, and one transmissive. This type of mirror is also referred to as an "output coupler". The output laser beam is emitted through this mirror.

Light of a specific wavelength that passes through the gain medium is amplified. Amplified is an increase in power. The mirrors ensure that most of the light makes many passes through the gain medium. Part of the light that is between the mirrors passes through the partially transparent mirror and escapes as a beam of light.

A laser system uses optics to reflect light through the lasing medium. The optics include at least a pair of mirrors located at the ends of the lasing medium. The first of these mirrors will reflect laser light to the second mirror, while the second end mirror splits the laser light approaching on it into two portions: A laser beam which is taken out of the laser system, and a reflected beam that is redirected back into the laser medium and then to the first mirror. The reflected beam is continuously amplified and this amplified beam is returned to the second mirror for continuing the generation of the laser beam.

Different types of laser systems are present. These laser systems include, for example, gas lasers, chemical lasers, dye lasers, metal-vapor lasers, solid-state lasers, and semiconductor lasers. A solid-state laser system uses a gain medium that is a solid, rather than a liquid, such as in dye laser systems or a gas as in gas laser systems. A disk laser is a type of solid-state laser system that has a heat sink and laser output that are realized on opposite sides of a layer of gain medium. Power scaling for disk laser systems may be limited by amplified spontaneous emissions (ASE). Amplified spontaneous emissions occurs when the lasing medium emits light spontaneously, and this light is amplified by the gain medium independent of the lasing process. Amplified spontaneous emissions are the light that enters the gain medium, is transmitted through the gain medium, and reflected with a different direction as the path defined by the lasing device. The path defined by the lasing device is the desired path of the laser. Power scaling is the act of increasing the power.

Accordingly, it would be advantageous to have a method and apparatus which takes into account one or more of the issues discussed above, as well as possibly other issues.

SUMMARY

The advantageous embodiments provide an apparatus comprising a substrate configured to increase an intensity of light at a desired wavelength. The substrate has a front side, a back side, and an outer edge, wherein the substrate is configured to reflect the light received on the front side of the substrate. The substrate comprises a ceramic. The apparatus also comprises a cooling system configured to allow liquid nitrogen to be transmitted through the cooling system and receive heat generated in the substrate from the back side of the substrate.

Another advantageous embodiment provides an apparatus. The apparatus comprises a substrate configured to increase an intensity of light at a desired wavelength. The substrate has a front side, a back side, and an outer edge, wherein the substrate is configured to reflect the light on the front side of the substrate. The apparatus also comprises a material in a number of locations in the substrate configured to attenuate the light passing through the material.

Yet another advantageous embodiment provides a method for managing light. The method comprises sending light from a pumping source onto a front side of a substrate which is configured to increase an intensity of light at a desired wavelength. The substrate comprises ceramic. The method also comprises removing heat from a back side of the substrate with a cooling system configured to allow liquid nitrogen to be transmitted through the cooling system. The method also comprises amplifying, by the substrate, the light at a desired wavelength as the light is transmitted through the substrate. The method also comprises reflecting the light to a location.

Yet another advantageous embodiment provides a method for managing light. The method comprises sending light from a pumping source onto a front side of a substrate which is configured to increase an intensity of light at a desired wavelength. The substrate is comprised of a plurality of sections. An edge of each section of the plurality of sections is surrounded by a material configured to attenuate the light from passing between the plurality of sections. The method also comprises removing heat from a back side of the substrate with a cooling system configured to allow a cooling agent to be transmitted through the cooling system. The method also comprises amplifying, by the substrate, the light at a desired wavelength as the light is transmitted through the substrate. The method also comprises reflecting the light to a location.

The features, functions, and advantages can be achieved independently in various embodiments of the present disclosure, or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
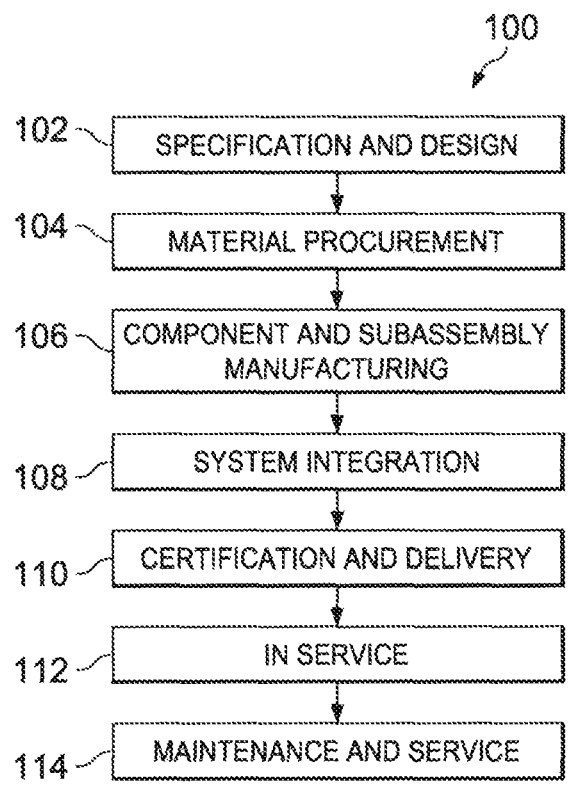
FIG. 1 is an illustration of an aircraft manufacturing and service method in accordance with an advantageous embodiment.
Figure 2:
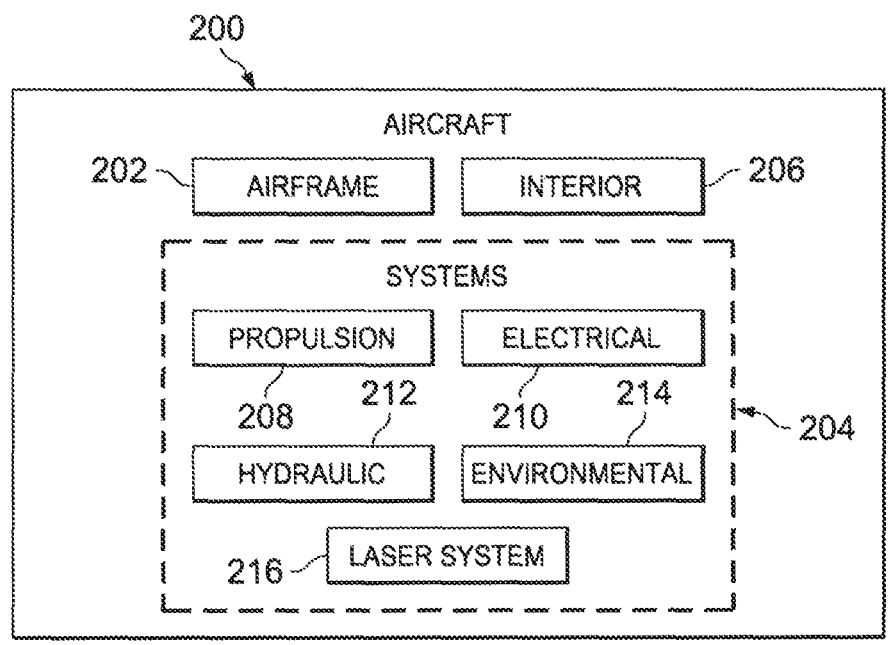
FIG. 2 is an illustration of an aircraft in which an advantageous embodiment may be implemented.

Referring more particularly to the drawings, embodiments of the disclosure may be described in the context of aircraft manufacturing and service method 100 as shown in FIG. 1 and aircraft 200 as shown in FIG. 2. Turning first to FIG. 1, an illustration of an aircraft manufacturing and service method is depicted in accordance with an advantageous embodiment. During pre-production, aircraft manufacturing and service method 100 may include specification and design 102 of aircraft 200 in FIG. 2 and material procurement 104.

During production, component and subassembly manufacturing 106 and system integration 108 of aircraft 200 in FIG. 2 takes place. Thereafter, aircraft 200 in FIG. 2 may go through certification and delivery 110 in order to be placed in service 112. While in service by a customer, aircraft 200 in FIG. 2 is scheduled for routine maintenance and service 114, which may include modification, reconfiguration, refurbishment, and other maintenance or service.

Each of the processes of aircraft manufacturing and service method 100 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

With reference now to FIG. 2, an illustration of an aircraft is depicted in which an advantageous embodiment may be implemented. In this example, aircraft 200 is produced by aircraft manufacturing and service method 100 in FIG. 1 and may include airframe 202 with a plurality of systems 204 and interior 206. Examples of plurality of systems 204 include one or more of propulsion 208, electrical 210, hydraulic 212, environmental 214, and laser system 216. Any number of other systems may be included. Although an aerospace example is shown, different advantageous embodiments may be applied to other industries, such as the automotive industry.

Apparatus and methods embodied herein may be employed during at least one of the stages of aircraft manufacturing and service method 100 in FIG. 1. As used herein, the phrase "at least one of", when used with a list of items, means that different combinations of one or more of the listed items may be used and only one of each item in the list may be needed. For example, "at least one of item A, item B, and item C" may include, without limitation, item A or item A and item B. This example also may include item A, item B, and item C or item B and item C.

As one illustrative example, components or subassemblies produced in component and subassembly manufacturing 106 in FIG. 1 may be fabricated or manufactured in a manner similar to components or subassemblies produced while aircraft 200 is in service 112 in FIG. 1. As yet another example, a number of apparatus embodiments, method embodiments, or a combination thereof may be utilized during production stages, such as component and subassembly manufacturing 106 and system integration 108 in FIG. 1.

The different advantageous embodiments recognize and take into account a number of different considerations. For example, the different advantageous embodiments recognize and take into account that current solutions to increasing beam power involve increasing the number of disks. By increasing the number of disks, the beam quality is reduced.

The advantageous embodiments recognize and take into account that lasing mediums heat as they are in operation. The larger the lasing medium, the more heat is produced. Current solutions use water to remove heat due to the high heat transfer rate of water.

The advantageous embodiments recognize that the amplified spontaneous emissions increase as the size of the lasing medium increases. Amplified spontaneous emissions limit the beam quality and gain of the lasing medium.

A number of the advantageous embodiments provide an apparatus and method comprising a substrate configured to increase an intensity of light at a desired wavelength. The substrate has a front side, a back side, and an outer edge. The substrate is configured to reflect the light received on the front side of the substrate. The substrate comprises ceramic. The substrate comprises a plurality of sections. The method and apparatus also comprise a material configured to attenuate the light from passing between the plurality of sections. The material surrounds an edge of each section of the plurality of sections. The apparatus and method also comprise a cooling system configured to allow liquid nitrogen to be transmitted through the cooling system and receive heat generated in the substrate from the back side of the substrate.

Figure 3:
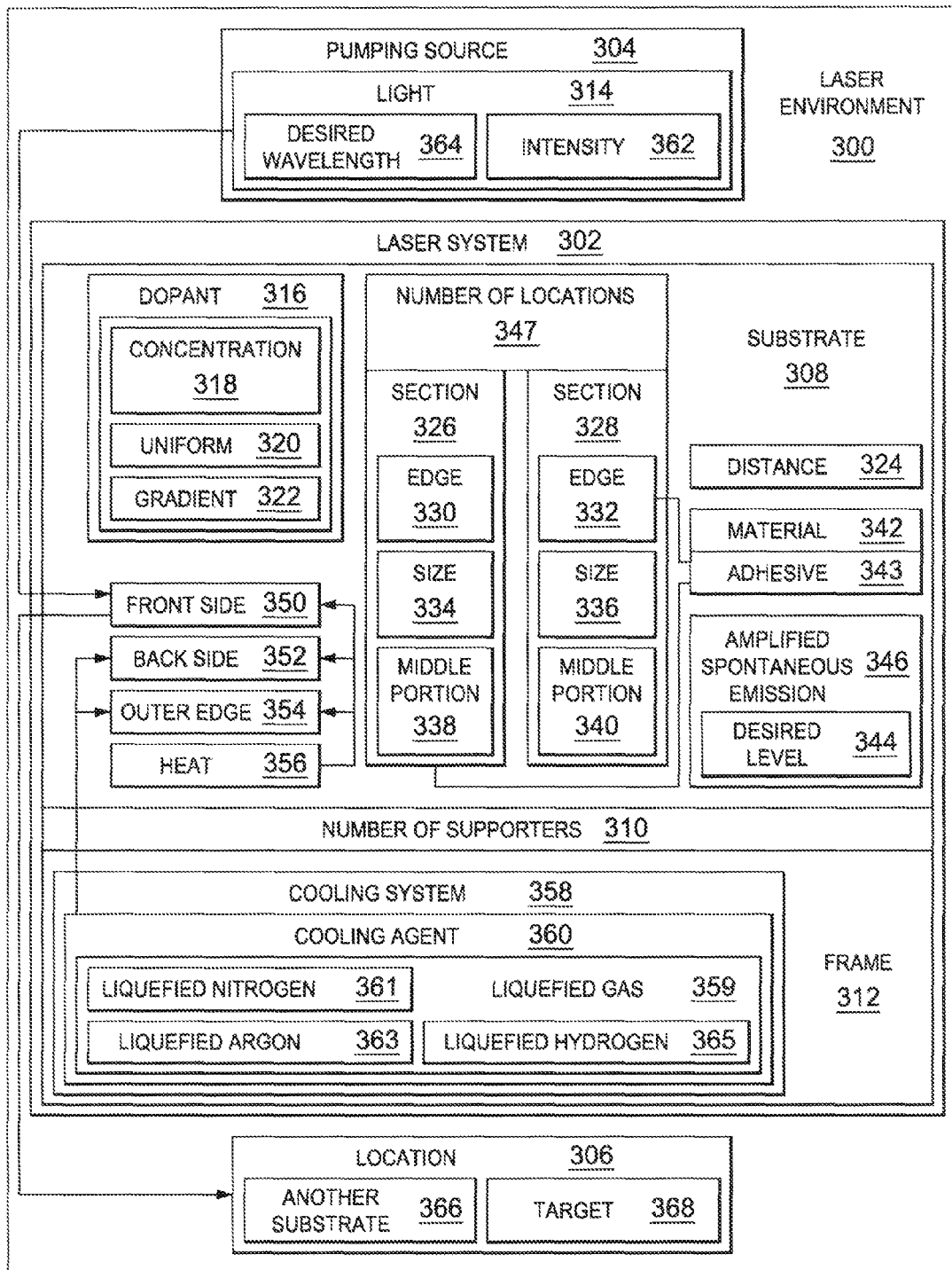
FIG. 3 is an illustration of a block diagram of a laser environment depicted in accordance with an advantageous embodiment.

Turning to FIG. 3, an illustration of a block diagram of a laser environment is depicted in accordance with an advantageous embodiment. Laser environment 300 comprises laser system 302, pumping source 304, and location 306.

Laser system 302 may produce a high-intensity optical, infrared, or ultraviolet radiation with photons as a result of stimulated emissions maintained within a solid, liquid, or gaseous medium. The photons involved in the emission process all have nearly the same energy and phase so that the laser beam is substantially monochromatic and coherent. Light is "monochromatic" when it contains one wavelength of light. Light is "coherent" when each photon moves in step with each of the other photons. Laser system 302 comprises substrate 308, number of supporters 310, and frame 312. A laser beam is substantially directional in one direction. In contrast, a flashlight releases light in many directions. Amplified spontaneous emissions are light traveling in directions other than those substantially traveling in the direction of the laser. The light comprising the laser is traveling in a direction that the optical devices are pointing.

Substrate 308 is the source of optical gain. Substrate 308 may be a lasing substrate. The gain results from the stimulated emissions of electronic or molecular transitions to a lower energy state from a higher energy state previously populated by pumping source 304. Pumping source 304 may be a semiconductor diode. Gain is the measure of the ability to increase the intensity of a signal, such as light 314. Substrate 308 may also be referred to as a lasing medium.

In the illustrative examples, substrate 308 is doped with ytterbium. In other illustrative examples, substrate 308 may be doped with other types of dopant 316 which produce amplification of at a desired wavelength, such as, for example, neodymium, erbium, and thulium. In the illustrative examples, substrate 308 may be, for example, about four to about six centimeters in diameter. In other illustrative examples, substrate 308 may be other diameters.

Substrate 308 may be comprised of crystalline, glass, ceramics, or some other suitable solid-state gain medium. An element is incorporated in the substrate 308 that is capable of supporting lasing by the process of amplifying light entering substrate 308. In these illustrative examples, substrate 308 is doped with dopant 316. Dopant 316 is an impurity added to substrate 308 to alter the optical properties. Concentration 318 of dopant 316 may be uniform 320 or have gradient 322. Uniform 320 will have the same concentration 318 throughout substrate 308. Gradient 322 comprises the concentration of dopant 316 that changes over distance 324 within substrate 308.

Substrate 308 may comprise a plurality of sections. Each section 326 and 328 comprises edges 330 and 332, sizes 334 and 336, and middle portions 338 and 340. Material 342 may be located between each section 326 and 328. Material 342 may be connected to sections 326 and 328 with adhesive 343. Adhesives used may include epoxies and cyanoacrylates. An epoxy is formed from the reaction of a resin and a hardener in response to a certain temperature. A cyanoacrylate is a generic name for an adhesive that comprises either methyl-2-cyanoacrylate or ethyl-2-cyanoacrylate. Material 342 may be connected to sections 326 and 328 without the use of an adhesive by establishing optical contact between these elements so that bonding occurs through the electrostatic forces, such as forces due to a polarization of particles. Establishing optical contact requires that the particles are subjected to a heat treatment and outgassing of volatile species. Outgassing is the slow release of gas that was trapped, frozen, or absorbed in some material. Outgassing may include sublimation and evaporation. Volatile species are compounds that have vapor pressures which are of a level to substantially vaporize in the atmosphere.

In the illustrative examples, any number of sections may exist of any size. The number of sections, along with the size of the plurality of sections is determined based on desired level 344 of amplified spontaneous emission 346.

Desired level 344 is the maximum desired level of amplified spontaneous emission 346. Amplified spontaneous emission 346 is light, produced by spontaneous emission, and amplified with the lasing medium. The light has been optically amplified by the process of stimulated emission in a gain medium. Optically amplified is when a device amplifies an optical signal, such as light, directly, without the need to first convert it to an electrical signal. Amplified spontaneous emission 346 decreases the amount of gain that occurs using a gain medium, such as substrate 308.

In different illustrative examples, material 342 may be placed throughout substrate 308 at number of locations 347. Number of locations 347 may be positioned in a manner that reduces amplified spontaneous emission 346. Material 342 may be different sizes and shapes at each location of number of locations 347. Material 342 attenuates light transmitting through material 342.

In the illustrative examples, material 342 is doped with chromium ions. The chromium ions may be tetravalent, such as in chromium 4. In other illustrative examples, material 342 may be doped with other types of dopant 316 which block the transmission of light.

In the depicted example, substrate 308 comprises front side 350, back side 352, and outer edge 354. When receiving light 314, substrate 308 produces heat 356. Heat 356 is located throughout substrate 308, including front side 350, back side 352, and outer edge 354. Heat 356 may or may not be distributed evenly throughout substrate 308.

Heat 356 may be reduced by cooling system 358. Cooling system 358 couples cooling agent 360 to substrate 308. Cooling agent 360 is a material and/or substance which removes the heat and decreases the temperature of substrate 308. In these examples, the coupling is such that cooling agent 360 transfers heat 356 from substrate 308 to cooling agent 360. Cooling agent 360 may be coupled to substrate 308 in a number of different ways. For example, cooling agent 360 may not directly touch substrate 308. In other words, another material or medium is not present between cooling agent 360 and substrate 308. Alternatively, cooling agent 360 may be coupled to substrate 308 using a material between cooling system 358 and substrate 308 removing heat 356 indirectly. In the illustrative examples, cooling system 358 is located in frame 312. In the illustrative examples, cooling agent 360 comprises liquefied nitrogen 361. In other examples, cooling agent 360 may be another type of liquefied gas 359, cryogenic fluid, or any other suitable cooling agent to maintain a desired temperature level, such as liquefied argon 363 and liquefied hydrogen 365.

Substrate 308 may be supported by number of supporters 310. Number of supporters 310 may be a material, such as a plastic, metal, or some other suitable material that keeps substrate 308 in place during operation. Number of supporters 310 may further be supported by frame 312.

During operation of laser system 302, pumping source 304 sends light 314 to front side 350 of substrate 308. Substrate 308 is configured to increase intensity 362 of light 314 at a desired wavelength 364. Desired wavelength 364 may be the wavelength or a range of wavelengths that substrate 308 is manufactured to respond.

Front side 350 of substrate 308 is configured to reflect light 314 at desired wavelength 364 with intensity 362 increased and towards location 306. Location 306 may be another substrate 366 or a target 368.

Laser environment 300 may comprise multiple laser systems such as laser system 302, and other laser systems similar to laser system 302. Each laser system may redirect light 314 to a next laser system.

Once light 314 has been reflected off of all laser systems, then light 314 may eventually be directed towards target 368. In an illustrative example, there are four laser systems. In the illustrative examples, any number of laser systems may be used to select a desired intensity of light 314.

The illustration of laser environment 300 in FIG. 3 is not meant to imply physical or architectural limitations to the manner in which different advantageous embodiments may be implemented. Other components in addition to, and/or in place of, the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, there may be more sections than section 326 and section 328 of FIG. 3. Also, cooling system 358 may not be located in frame 312 as shown in FIG. 3.

Figure 4:
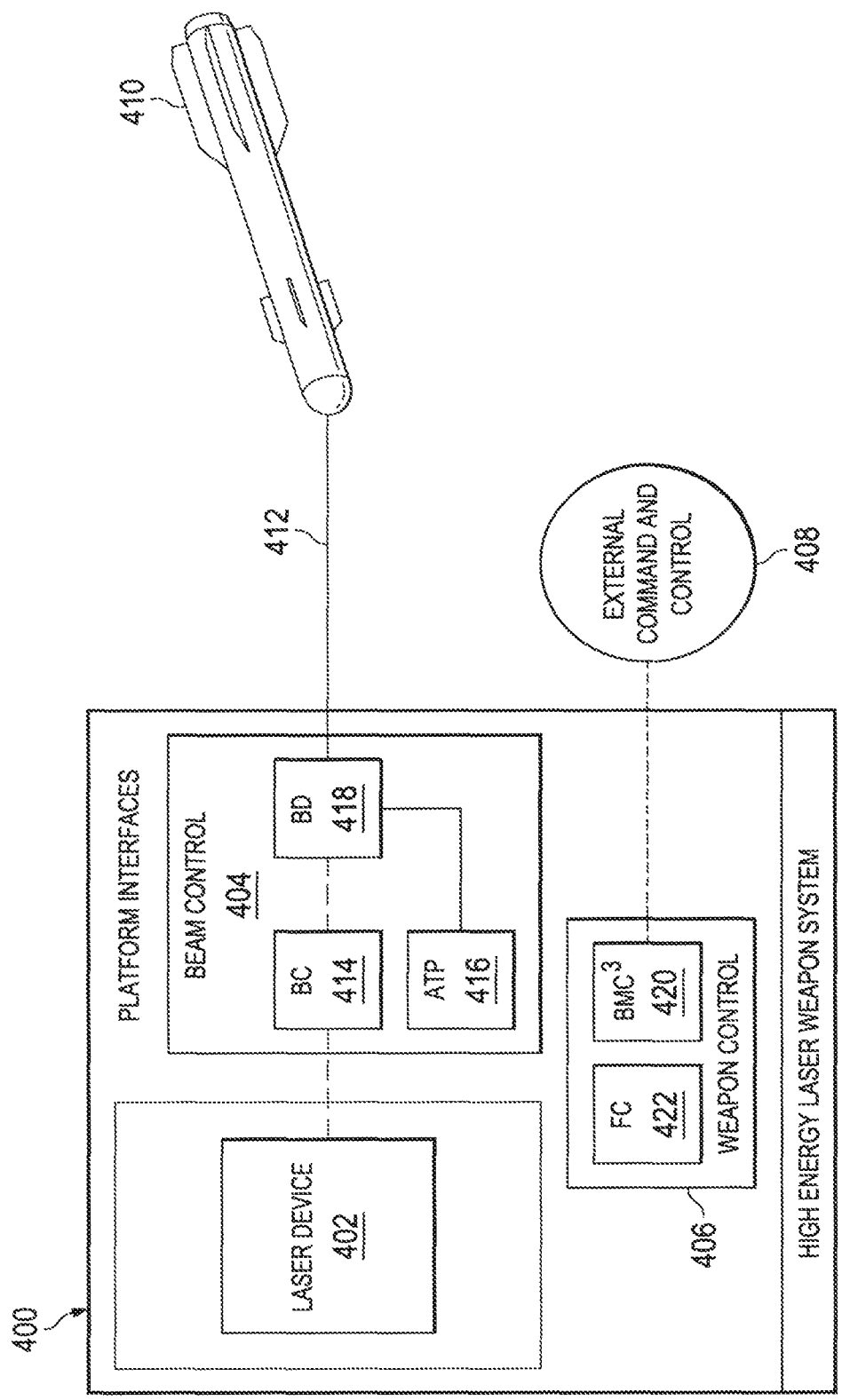
FIG. 4 is an illustration of a block diagram of a laser environment depicted in accordance with an advantageous embodiment.

Turning to FIG. 4, an illustration of a block diagram of a laser weapon is depicted in accordance with an advantageous embodiment. Laser weapon 400 may be one example of one implementation of laser environment 300 of FIG. 3. Laser weapon 400 comprises laser device 402, beam control system 404, weapon control 406, and external command and control 408. Laser weapon 400 may be utilized to project a focused and stabilized laser beam 412 onto a target 410.

Beam control system 404 manages and stabilizes laser beam 412 from laser device 402, obtains an image of target 410, and projects laser beam 412 onto target 410. Beam controller 414 manages and stabilizes laser beam 412. Acquisition tracking and pointing 416 gets images of target 410 from natural light or an illumination source included with beam director 418. Acquisition tracking and pointing 416 provides beam director 418 the direction and/or location of target 410. Beam director 418 projects laser beam 412 onto target 410 and receives light from target 410 for use in acquisition tracking and pointing 416.

Weapon control 406 manages the operation of laser weapon 400 based on information from external command and control 408 and targeting information developed in beam control system 404. Battle management control 420 provides interaction with elements external to laser weapon 400, including external command and control 408. Fire control 422 provides coordination and control of the operations of all elements of laser weapon 400. External command and control 408 may be control commands coming from an external source which may or may not be remote to laser weapon 400.

Laser system 402 may be one example of one implementation of laser system 302 of FIG. 3.

Figure 5:
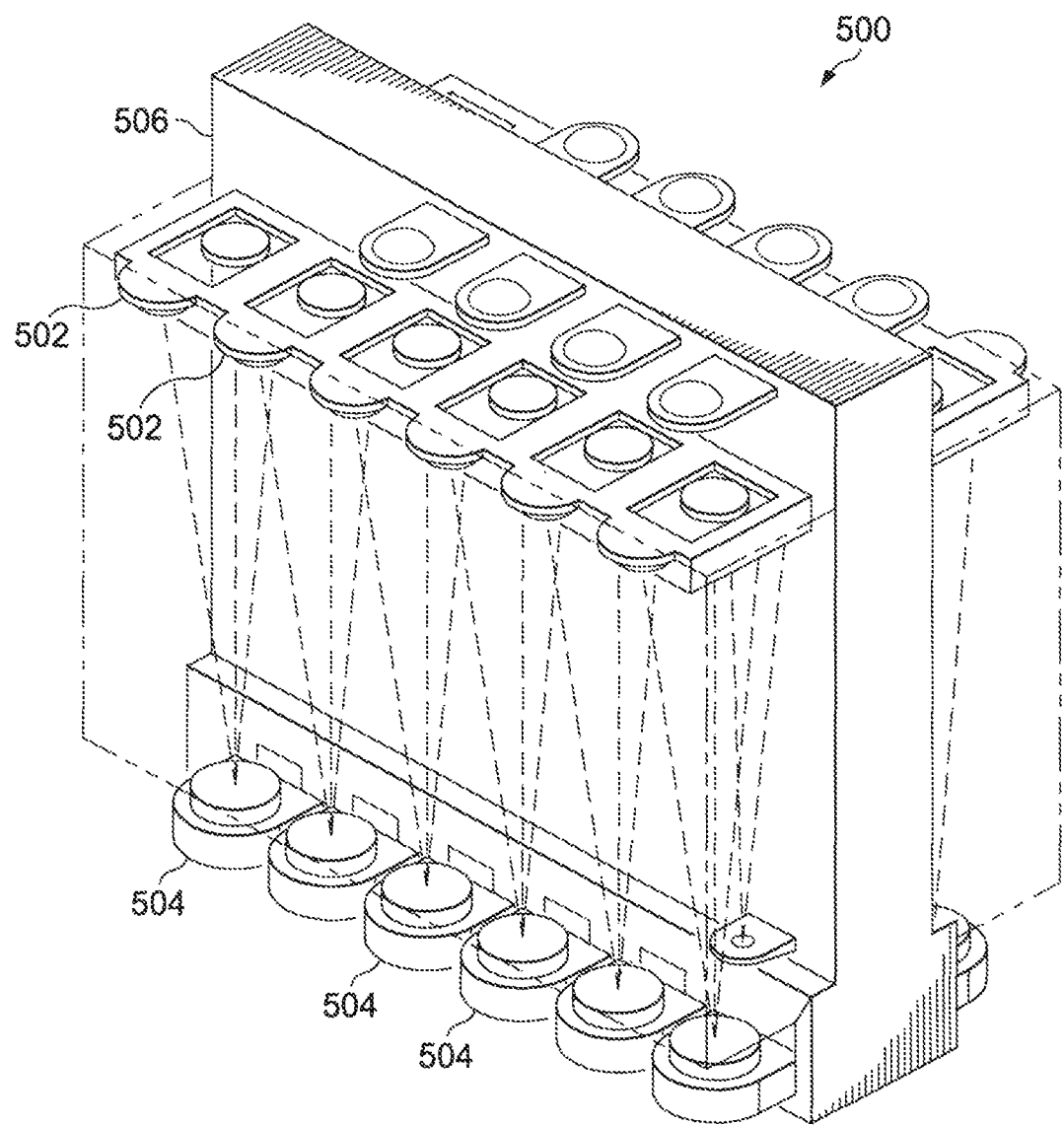
FIG. 5 is an illustration of a laser environment depicted in accordance with an advantageous embodiment.

Turning now to FIG. 5, an illustration of a laser device is depicted in accordance with an advantageous embodiment. Laser device 500 is an illustration of a laser system with plurality of reflectors 502 for each laser substrate of plurality of laser substrates 504. Each laser substrate in plurality of laser substrates 504 may be one implementation of one example of substrate 308 of FIG. 3. Plurality of laser substrates 504 and reflectors 502 may be mounted on bench 506 that maintains the positioning of plurality of laser substrates 504 and plurality of reflectors 502.

Figure 6:
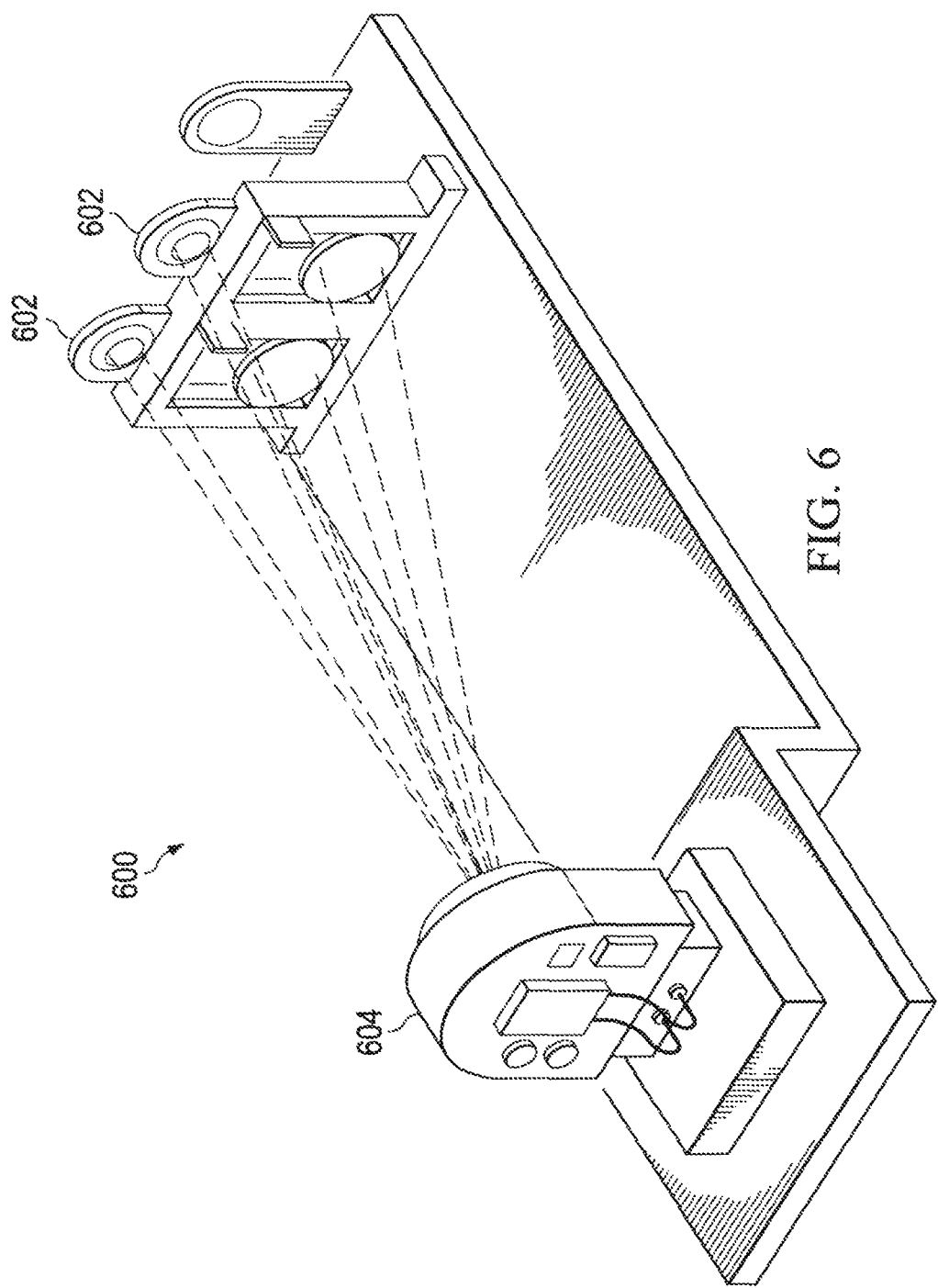
FIG. 6 is an illustration of a laser system depicted in accordance with an advantageous embodiment.

Turning now to FIG. 6, an illustration of a laser is depicted in accordance with an advantageous embodiment. Laser unit 600 is a portion of laser device 500 of FIG. 5. Laser unit 600 comprises reflector 602 and laser substrate 604. Laser unit 600 may be one implementation of one example of laser system 302 of FIG. 3. In reference to FIG. 5, laser unit 600 may be independently mounted onto laser bench 506 as well as other lasing units to comprise laser device 500.

Figure 7:
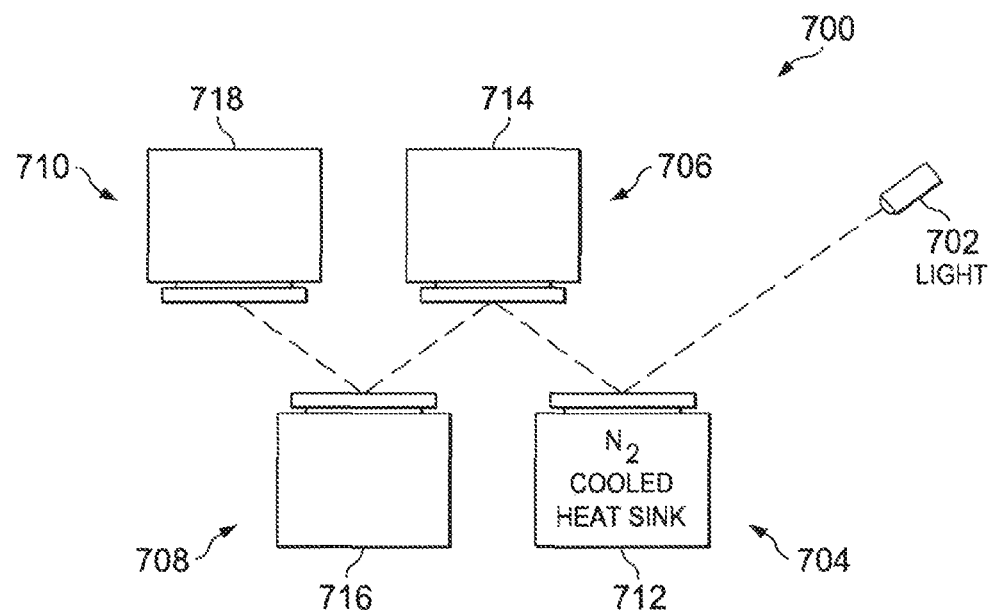
FIG. 7 is an illustration of a plurality of laser systems depicted in accordance with an advantageous embodiment.

Turning now to FIG. 7, an illustration of a plurality of laser substrates is depicted in accordance with an advantageous embodiment. Plurality of laser systems 700 may be one example of one illustration of laser system 302 of FIG. 3 with multiple laser systems.

Light 702 may be sent from a pumping source to laser system 704. Laser system 704 may increase the intensity of light 702 and reflect light 702 to laser system 706, which in turn also increases the intensity of light 702. Laser system 706 reflects light 702 to laser system 708, which in turn also increases the intensity of light 702. Laser system 708 reflects light 702 to laser system 710, which in turn also increases the intensity of light 702.

Laser system 710 reflects light 702 to a target or some other device used to redirect light 702 away from the plurality of laser systems. Each laser system 704, 706, 708, and 710 is cooled by liquid nitrogen heat sinks 712, 714, 716, and 718.

Figure 8:
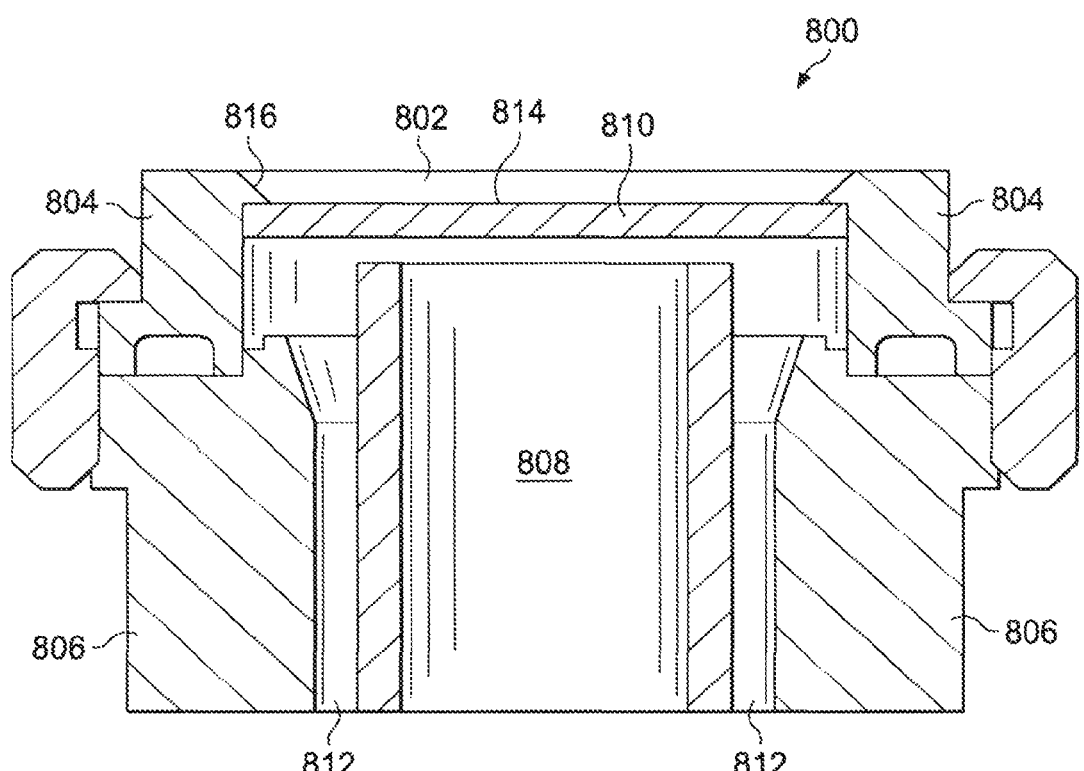
FIG. 8 is an illustration of a laser system depicted in accordance with an advantageous embodiment.

Turning now to FIG. 8, an illustration of a laser system is depicted in accordance with an advantageous embodiment. Laser system 800 may be one example of one illustration of laser system 302 of FIG. 3.

Laser system 800 comprises lasing substrate 802, supporters 804, frame 806, and cooling system 808. Cooling system 808 may also be referred to as a showerhead. Cooling system 808 may be one example of one illustration of cooling system 358 of FIG. 3. Although not depicted, cooling system 808 may have a number of micro channels for a cooling agent to travel through at the end closest to lasing substrate 802.

A cooling agent may be dispersed against material 810. Material 810 may be any type of material capable of being affected by the cooling agent. In the illustrative examples, material 810 may be a conductive material, such as copper. In other illustrative examples, material 810 may be copper alloys, aluminum and aluminum alloys, silicon carbide, and carbon forms including graphene and diamond. Once the cooling agent has been transmitted through cooling system 808, the cooing agent exits frame 806 through channels 812. In the illustrative examples, cooling agent 806 may partially evaporate and partially be reused. In other illustrative examples, cooling agent 806 may fully evaporate or be fully reused. Cooling system 808 is a face cooling system because it does not directly cool the edges of lasing substrate 802 and only directly cools back side 814 of lasing substrate 802.

In other illustrative examples, cooling system 808 may be an edge cooling system. An edge cooling system allows the cooling agent to directly cool outer edge 816 of lasing substrate 802. Directly means by the cooling agent touching lasing substrate 802 or by touching through a material such as material 810.

Figure 9:
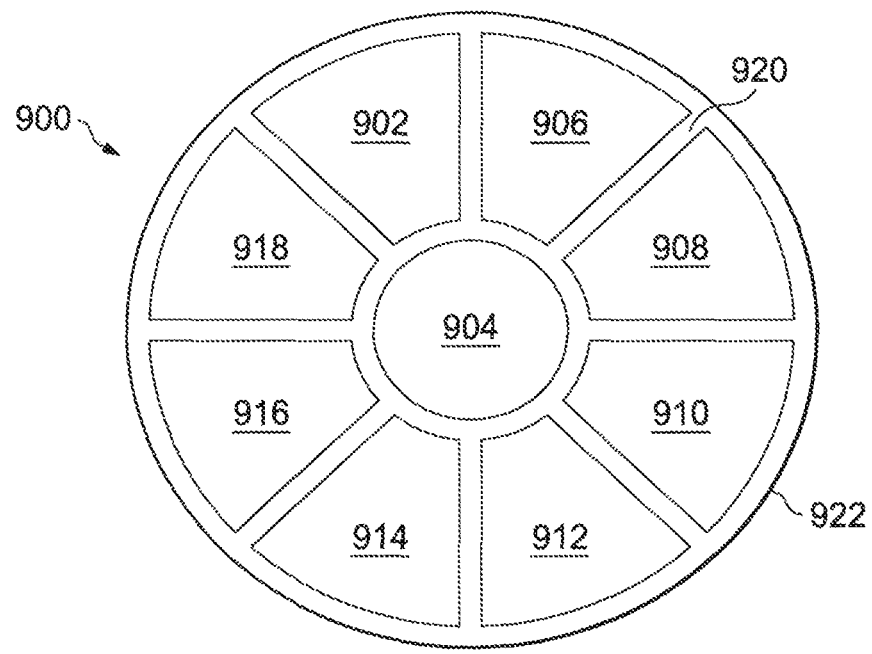
FIG. 9 is an illustration of a front face view of a lasing substrate depicted in accordance with an advantageous embodiment.

Turning now to FIG. 9, an illustration of a front face view of a lasing substrate is depicted in accordance with an advantageous embodiment. Lasing substrate 900 is an example of one implementation of substrate 308 of FIG. 3.

Lasing substrate 900 has a plurality of sections, such as sections 902-918. Sections 902-918 may be of different shapes and/or sizes. In the illustrative examples, sections 902-918 are of the same thickness. In other illustrative examples, sections 902-918 may be different thicknesses.

Each section of the plurality of sections such as sections 902-918 has material 920 between them. Material 920 is a type of suppression material and attenuates light transmitting between different sections causing interference. Additionally, lasing substrate 900 has material 920 around outer edge 922 of lasing substrate 900.

In other illustrative examples, material 920 may not be a different material from sections 902-918, but instead the same material with a different doping or no doping. When material 920 is the same material as sections 902-918, the entire lasing substrate 900 may be manufactured on a single disk.

Figure 10:
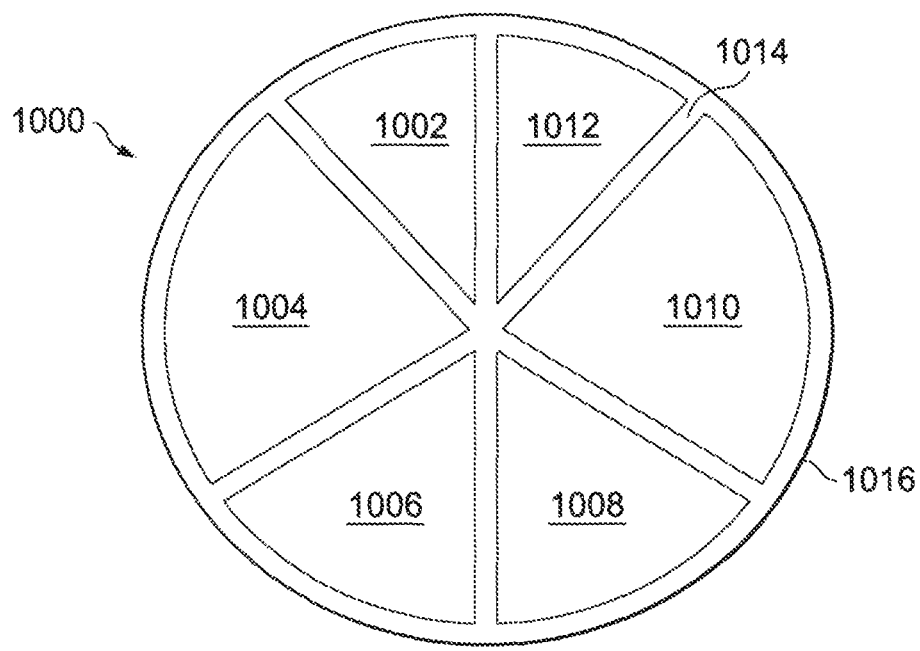
FIG. 10 is an illustration of a front face view of a lasing substrate depicted in accordance with an advantageous embodiment.

Turning now to FIG. 10, an illustration of a front face view of a lasing substrate is depicted in accordance with an advantageous embodiment. Lasing substrate 1000 may be one example of one illustration of plurality of substrate 308 of FIG. 3. Lasing substrate 1000 is similar to lasing substrate 900, except lasing substrate 1000 has a different number of sections with different shapes and sizes.

Lasing substrate 1000 has a plurality of sections, such as sections 1002-1012. Sections 1002-1012 may be of different shapes and sizes. In the illustrative examples, sections 1002-1012 are of the same thickness. In other illustrative examples, sections 1002-1012 may be different thicknesses.

Each section of the plurality of sections such as sections 1002-1012 has material 1014 between them. Material 1014 is a type of suppression material and attenuates light transmitting between different sections causing interference. Additionally, lasing substrate 1000 has material 1000 around outer edge 1016 of lasing substrate 1000.

In other illustrative examples, material 1014 may not be a different material from sections 1002-1012, but instead the same material with a different doping or no doping. When material 1014 is the same material as sections 1002-1012, the entire lasing substrate 1000 may be manufactured on a single disk.

Figure 11:
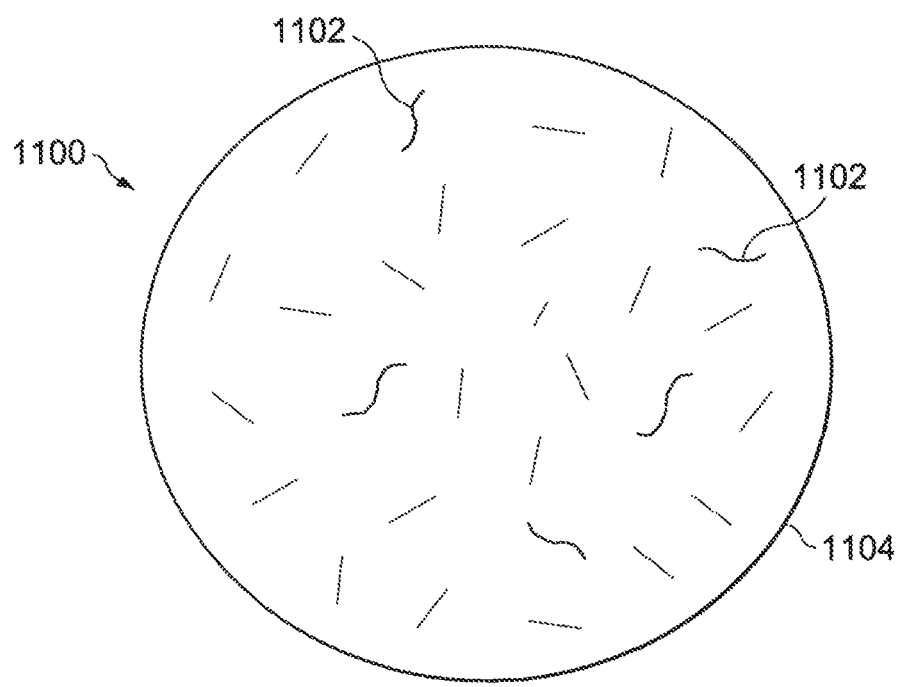
FIG. 11 is an illustration of a front face view of a lasing substrate depicted in accordance with an advantageous embodiment.

Turning now to FIG. 11, an illustration of a front face view of a lasing substrate is depicted in accordance with an advantageous embodiment. Lasing substrate 1100 may be one example of one illustration of substrate 308 in FIG. 3.

Lasing substrate 1100 has a material number of locations 1102. The material is a type of suppression material and attenuates light transmitting through the material. Additionally, lasing substrate 1100 may have the material around outer edge 1104 of lasing substrate 1100.

In different illustrative examples, the material may be placed throughout lasing substrate 1100 at number of locations 1102. Number of locations 1102 may be positioned in a manner that reduces amplified spontaneous emission. The material may be different sizes and shapes at each location of number of locations 1102.

Figure 12:
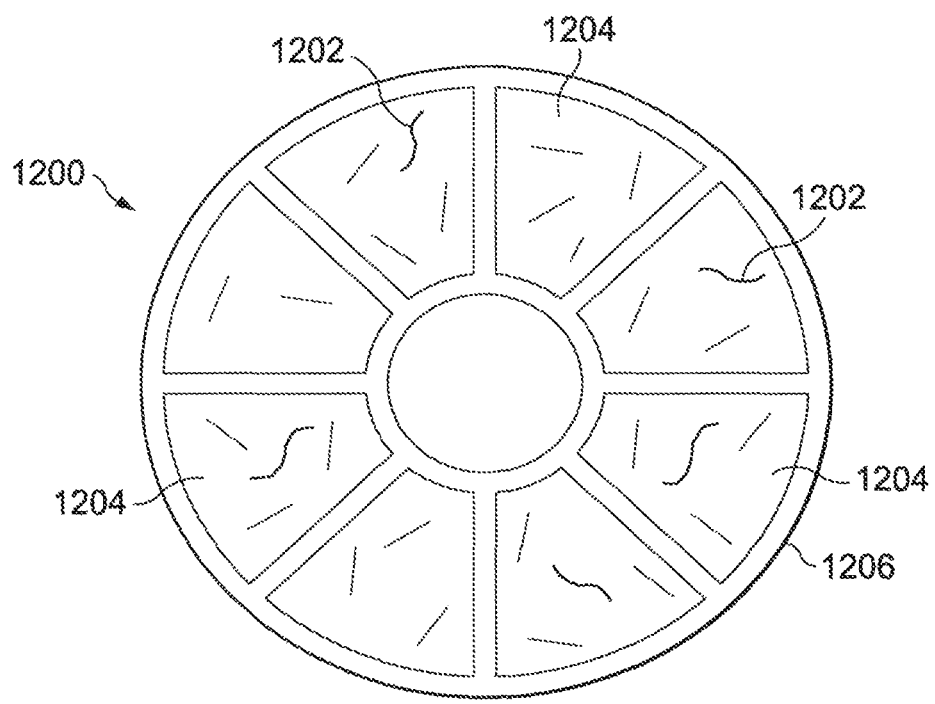
FIG. 12 is an illustration of a front face view of a lasing substrate depicted in accordance with an advantageous embodiment.

Turning now to FIG. 12, an illustration of a front face view of a lasing substrate is depicted in accordance with an advantageous embodiment. Lasing substrate 1200 is an example of one implementation of substrate 308 in FIG. 3. Lasing substrate 1200 is similar to lasing substrate 900 in FIG. 9, except lasing substrate 1200 has a material at number of locations 1202.

Lasing substrate 1200 has a plurality of sections, such as sections 1204. Each section of the plurality of sections such as sections 1204 has the material between them. The material is a type of suppression material and attenuates light transmitting through the material. Additionally, lasing substrate 1200 has the material around outer edge 1206 of lasing substrate 1200. In addition to between sections 1204 and around outer edge 1206, lasing substrate 1200 has the material at number of locations 1202.

In different illustrative examples, the material may be placed throughout lasing substrate 1200 at number of locations 1202. Number of locations 1202 may be positioned in a manner that reduces amplified spontaneous emission. The material may be different sizes and shapes at each location of number of locations 1202.

Figure 13:
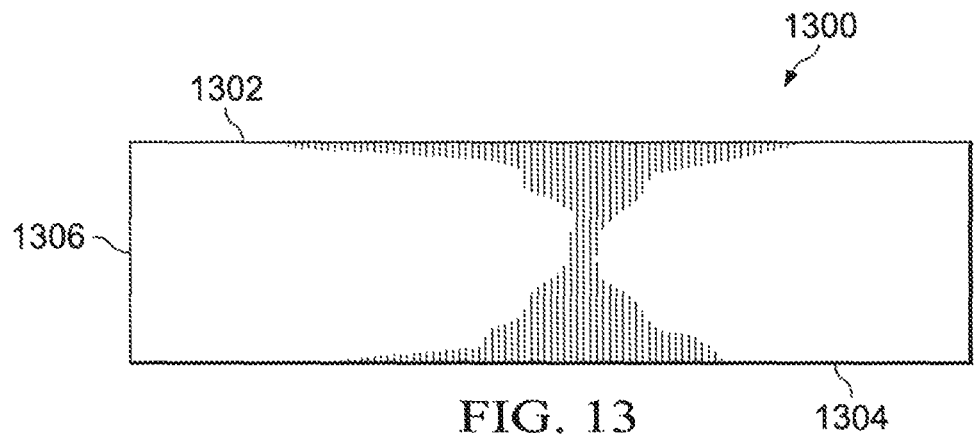
FIG. 13 is an illustration of a side view of a lasing substrate depicted in accordance with an advantageous embodiment.

Turning now to FIG. 13, an illustration of a side view of a lasing substrate is depicted in accordance with an advantageous embodiment. Lasing substrate 1300 may be one example of one illustration of substrate 308 in FIG. 3. Lasing substrate 1300 has front side 1302, back side 1304, and outer edge 1306.

Figure 14:
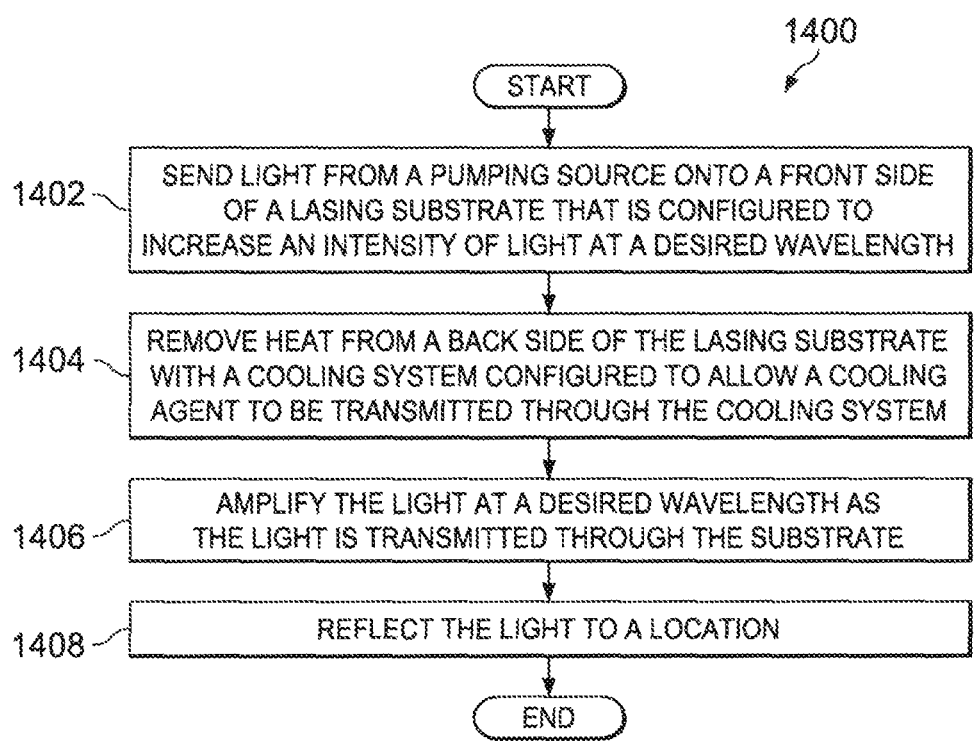
FIG. 14 is an illustration of a flowchart of a process for managing light depicted in accordance with an advantageous embodiment.

Turning now to FIG. 14, an illustration of a flowchart for managing light is depicted in accordance with an advantageous embodiment. Process 1400 depicts a process for reflecting light.

The process begins by sending light from a pumping source onto a front side of a lasing substrate that is configured to increase an intensity of light at a desired wavelength (operation 1402). The lasing substrate may comprise ceramic. A concentration of dopant in the lasing substrate is at least one of uniform within the lasing substrate and gradient. The gradient comprises the concentration of the dopant changes over a distance within the lasing substrate.

The lasing substrate may be comprised of a plurality of sections. An edge of each section of the plurality of sections may be surrounded by a suppression material configured to attenuate the light passing between the plurality of sections. A number and size of the plurality of sections is determined based on a desired level of amplified spontaneous emission. In one or more advantageous embodiments, the suppression material may be connected to the plurality of sections with an adhesive.

In other illustrative examples, the suppression material is part of the lasing substrate. The lasing substrate may be doped with a gradient. The concentration of the dopant changes over a distance within the lasing substrate and the concentration is less at the edge of each section of the plurality of sections than in a middle portion of each section of the plurality of sections.

The process also removes heat from a back side of the lasing substrate with a cooling system configured to allow a cooling agent to be transmitted through the cooling system (operation 1404). The cooling agent may be liquid nitrogen or some other appropriate cooling agent such as a different type of liquid gas. The process also amplifies, by the lasing substrate, the light at a desired wavelength as the light is transmitted through the substrate (operation 1406). The process also reflects the light to a location (operation 1408) with the process terminating thereafter. The location may be another substrate or a target.

The flowcharts and block diagrams in the different depicted embodiments illustrate the architecture, functionality, and operation of some possible implementations of apparatus and methods in different advantageous embodiments. In this regard, each block in the flowcharts or block diagrams may represent a module, segment, function, and/or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram.

In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved. Also, other blocks may be added in addition to the illustrated blocks in a flowchart or block diagram. For example, in different advantageous embodiments, operation 1204 and operation 1206 of FIG. 12 may be performed at the same time.

The advantageous embodiments provide an apparatus and method comprising a substrate configured to increase an intensity of light at a desired wavelength. The substrate has a front side, a back side, and an outer edge. The substrate is configured to reflect the light received on the front side of the substrate. The substrate comprises crystalline or ceramic materials. The substrate comprises a plurality of sections. The method and apparatus also comprise a material configured to attenuate the light passing between the plurality of sections. The material surrounds an edge of each section of the plurality of sections. The apparatus and method also comprise a cooling system configured to allow liquid nitrogen to be transmitted through the cooling system and receive heat generated in the substrate from the back side of the substrate.

The advantageous embodiments recognize that current solutions to increasing beam power involve increasing the number of disks. By increasing the number of disks, the beam quality is reduced. The advantageous embodiments provide an apparatus and method to increase beam power while maintaining beam quality by using a small number of disks but increasing the power amplified by each disk. In this manner, the intensity of the laser beam and of the pump light can be maintained at a desired level as the beam power is increased.

The advantageous embodiments recognize that lasing mediums heat as they are in operation. The hotter the lasing medium, the more heat is produced due to reduced efficiency in the lasing process and due to increased rate of processes such as amplified spontaneous emission. Current solutions use water to remove heat due to water's high heat transfer rate. The advantageous embodiments provide an apparatus and method to keep heat at a lower level than with the use of water. The advantageous embodiments recognize that even though liquefied gas coolants, such as liquid nitrogen, cool at a rate of about a third of water at the same temperature difference between the coolant and the source of the heat, liquid nitrogen allows the operating temperature of the lasing medium to be maintained at a lower temperature because liquid nitrogen is much colder than water.

The advantageous embodiments recognize that the larger the size of the lasing medium, the larger the amplified spontaneous emissions. Amplified spontaneous emissions limit the efficiency of the lasing medium and may also impact the beam quality due to increased heat release within the lasing medium. The advantageous embodiments provide an apparatus and method to allow for larger lasing mediums while keeping amplified spontaneous emissions low. The advantageous embodiments provide for separating the lasing medium into sections. Therefore, each section may be small and have low amplified spontaneous emissions.

The different advantageous embodiments also provide a material for suppressing and attenuating light transmitting through the material. The material may be doped with chromium ions. The material may be located in different locations throughout the substrate, between section, around the outer edge of the substrate, and other suitable locations.

Although the different advantageous embodiments have been described with respect to parts for aircraft, other advantageous embodiments may be applied to parts for other types of vehicles. For example, without limitation, other advantageous embodiments may be applied to other vehicles which have a need to provide a laser system.

Figure 15:
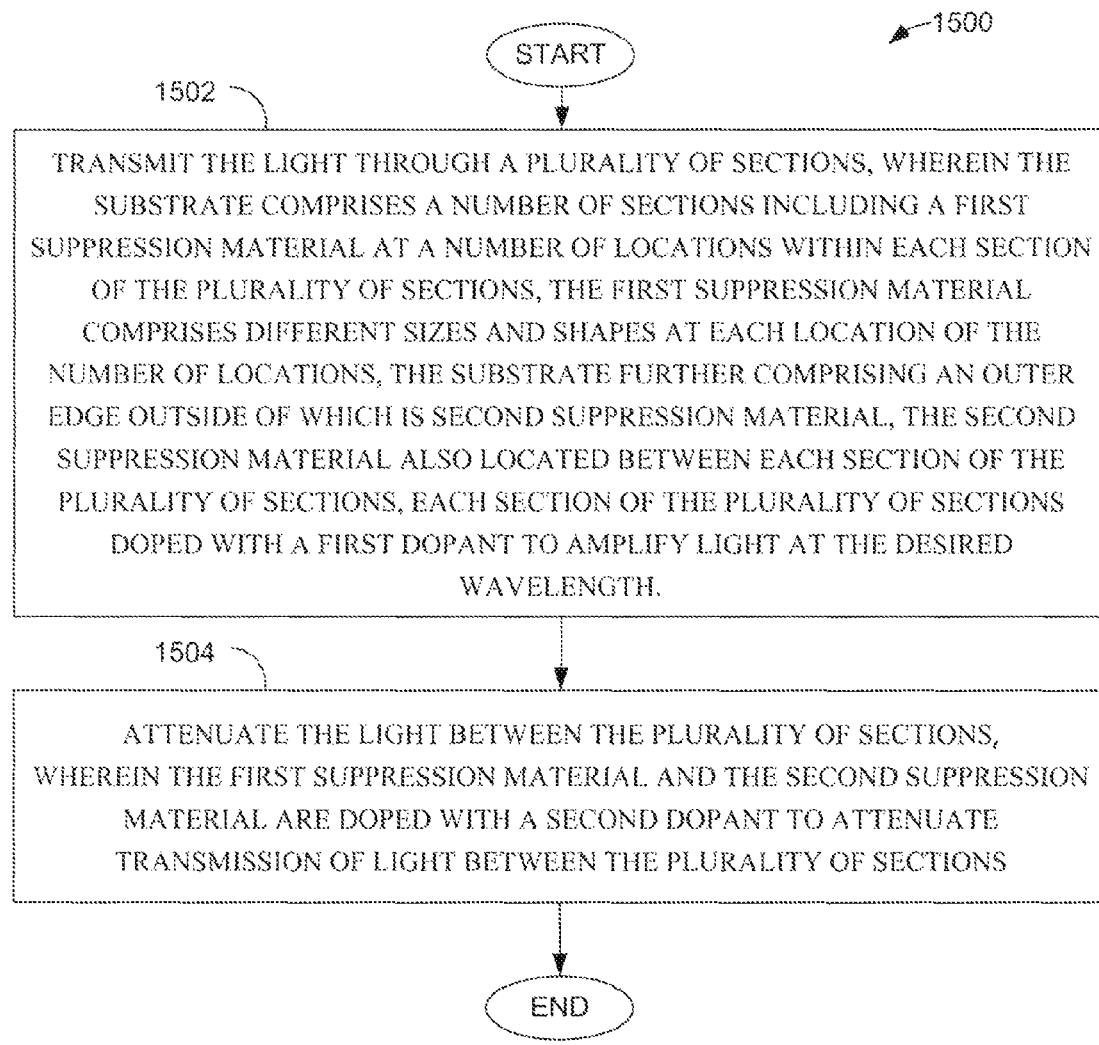
FIG. 15 is a flowchart illustrating a method of managing light, in accordance with an advantageous embodiment.

FIG. 15 is a flowchart illustrating a method of managing light, in accordance with an advantageous embodiment. Method 1500 may be an extension of method 1400 of FIG. 14. Method 1500 may begin by transmitting the light through the plurality of sections, wherein the substrate comprises a number of sections including a first suppression material at a number of locations within each section of the plurality of sections, the first suppression material comprises different sizes and shapes at each location of the number of locations, the substrate further comprising an outer edge outside of which is second suppression material, the second suppression material also located between each section of the plurality of sections, each section of the plurality of sections doped with a first dopant to amplify light at the desired wavelength (operation 1502).

Thereafter, method 1500 may include attenuating the light between the plurality of sections, wherein the first suppression material and the second suppression material are doped with a second dopant to attenuate transmission of light between the plurality of sections (operation 1504). In an illustrative embodiment, the cooling agent comprises a liquefied gas. The process may terminate thereafter.

Figure 16:
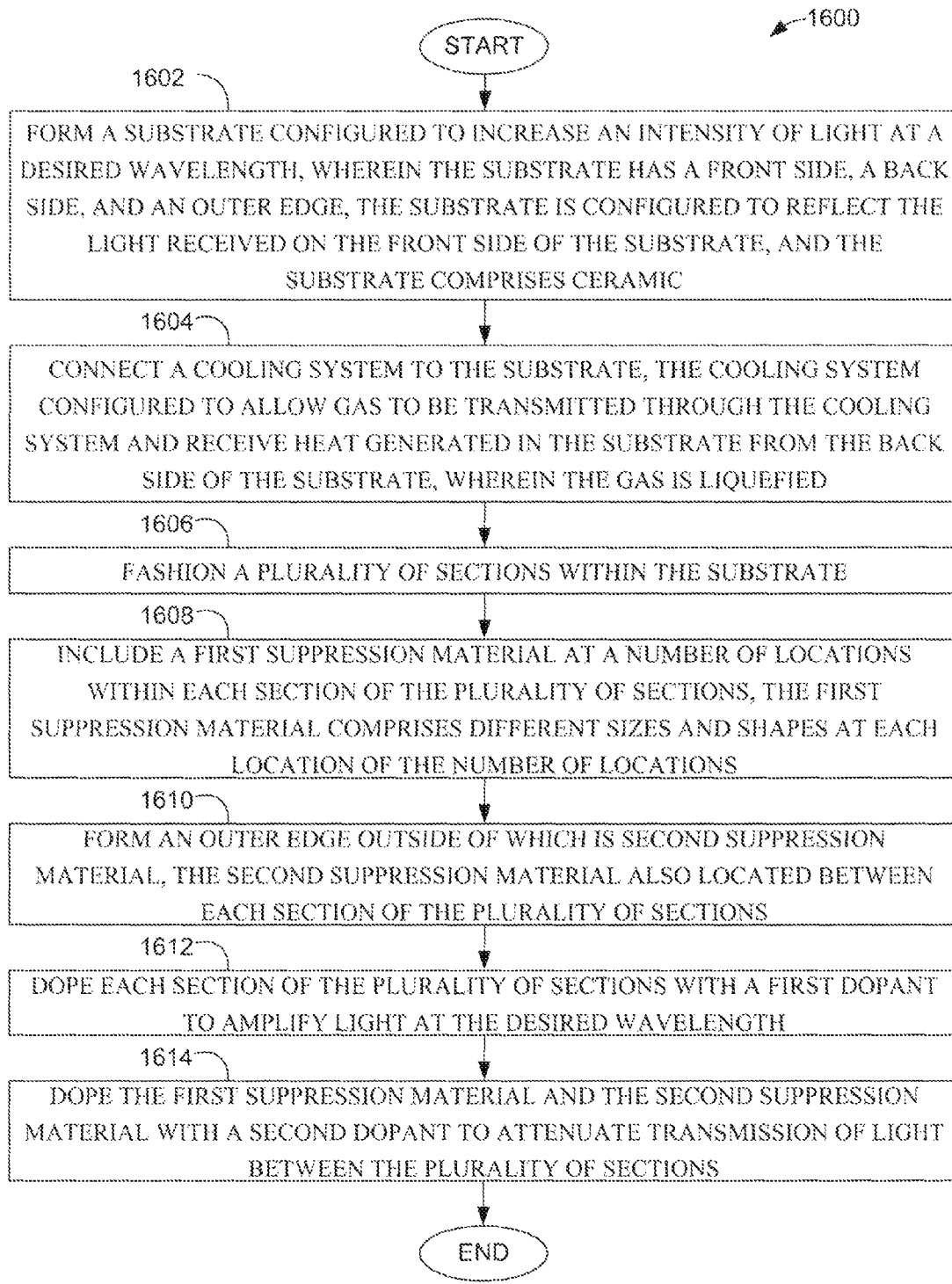
FIG. 16 is a flowchart illustrating a method of manufacturing, in accordance with an advantageous embodiment.

FIG. 16 is a flowchart illustrating a method of manufacturing, in accordance with an advantageous embodiment. Method 1600 may begin by forming a substrate configured to increase an intensity of light at a desired wavelength, wherein the substrate has a front side, a back side, and an outer edge, the substrate is configured to reflect the light received on the front side of the substrate, and the substrate comprises ceramic (operation 1602). Method 1600 may also include connecting a cooling system to the substrate, the cooling system configured to allow gas to be transmitted through the cooling system and receive heat generated in the substrate from the back side of the substrate, wherein the gas is liquefied (operation 1602). The process may terminate thereafter.

Optionally, method 1600 may be varied by how the substrate is formed. For example, method 1600 may include fashioning a plurality of sections within the substrate (operation 1606). Method 1600 may include including a first suppression material at a number of locations within each section of the plurality of sections, the first suppression material comprises different sizes and shapes at each location of the number of locations (operation 1608). Method 1600 may also include forming an outer edge outside of which is second suppression material, the second suppression material also located between each section of the plurality of sections (operation 1610).

Method 1600 may be further varied. For example, method 1600 may include doping each section of the plurality of sections with a first dopant to amplify light at the desired wavelength (operation 1612). Method 1600 may also include doping the first suppression material and the second suppression material with a second dopant to attenuate transmission of light between the plurality of sections (operation 1614).

Method 1600 may be varied still further. For example, doping each section of the plurality of sections with a first dopant comprises changing a concentration of the first dopant over a distance so that the concentration is less at the edge of each section of the plurality of sections than in a middle portion of each section of the plurality of sections. Method 1600 may include determining a number and sizes of the plurality of sections based on a desired level of amplified spontaneous emission, wherein a determination is made.

Method 1600 may include adjusting the number and sizes of the plurality of sections based on the determination.

In other illustrative embodiments, method 1600 may include positioning the number of locations of the first suppression material in a manner to reduce amplified spontaneous emission. In an illustrative embodiment, connecting the cooling system comprises connecting a face cooling system and wherein the cooling system is connected such that the cooling system does not directly cool an edge of the substrate and is configured to cool a back side of the substrate.

In still other illustrative embodiments, method 1600 may include selecting the first dopant from the group consisting of ytterbium, neodymium, erbium, and thulium. Likewise, method 1600 may include selecting the second dopant to be chromium ions that are tetravalent. Method 1600 may include forming the substrate to be about 4 centimeters to about 6 centimeters in diameter.

Figure 17:
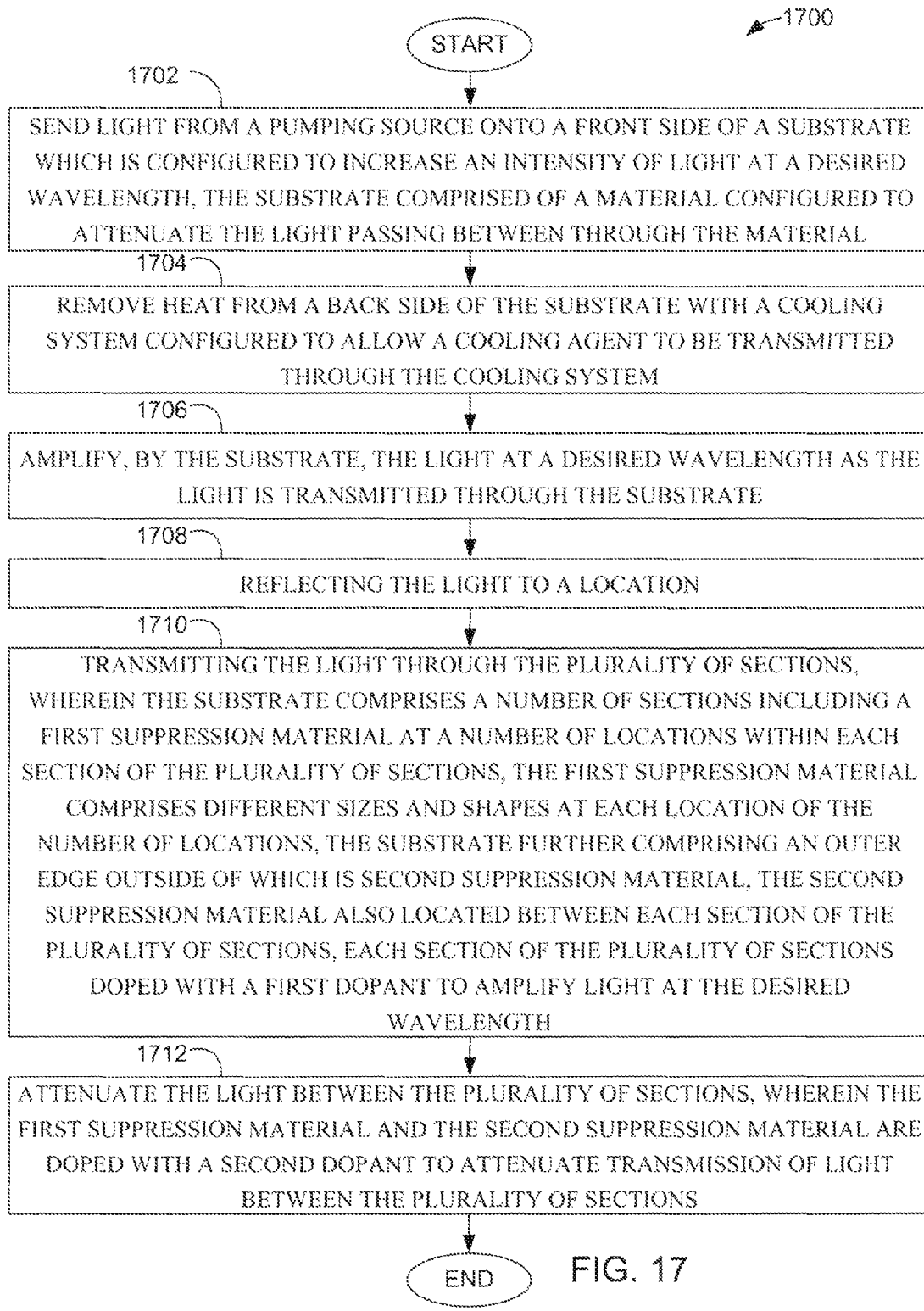
FIG. 17 is a flowchart illustrating a method of managing light, in accordance with an advantageous embodiment.

FIG. 17 is a flowchart illustrating a method of managing light, in accordance with an advantageous embodiment. Method 1700 may include sending light from a pumping source onto a front side of a substrate which is configured to increase an intensity of light at a desired wavelength, the substrate comprised of a material configured to attenuate the light passing between through the material (operation 1702). Method 1700 may also include removing heat from a back side of the substrate with a cooling system configured to allow a cooling agent to be transmitted through the cooling system (operation 1704). Method 1700 may also include amplifying, by the substrate, the light at a desired wavelength as the light is transmitted through the substrate (operation 1706). Method 1700 may also include reflecting the light to a location (operation 1708). The process may terminate thereafter.

Method 1700 may be further extended or varied. For example, method 1700 may further include transmitting the light through the plurality of sections, wherein the substrate comprises a number of sections including a first suppression material at a number of locations within each section of the plurality of sections, the first suppression material comprises different sizes and shapes at each location of the number of locations, the substrate further comprising an outer edge outside of which is second suppression material, the second suppression material also located between each section of the plurality of sections, each section of the plurality of sections doped with a first dopant to amplify light at the desired wavelength (operation 1710).

In this case, method 1700 may also include attenuating the light between the plurality of sections, wherein the first suppression material and the second suppression material are doped with a second dopant to attenuate transmission of light between the plurality of sections (operation 1712). The process may terminate thereafter.

Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications, as are suited to the particular use contemplated.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand.

What is claimed is:

1. A method for managing light, the method comprising:
    sending light from a pumping source onto a front side of a substrate comprising ceramic which is configured to increase an intensity of light at a desired wavelength, wherein the substrate comprises a plurality of sections including a first suppression material at a number of locations within each section of the plurality of sections, the first suppression material comprises different sizes and shapes at each location of the number of locations, the substrate further comprising an outer edge outside of which is second suppression material, the second suppression material also located between each section of the plurality of sections, each section of the plurality of sections doped with a first dopant to amplify light at the desired wavelength;
    removing heat from a back side of the substrate with a cooling system configured to allow a gas to be transmitted through the cooling system, the gas being liquefied;
    amplifying, by the substrate, the light at a desired wavelength as the light is transmitted through the substrate by transmitting the light through the plurality of sections; and
    reflecting the light to a location.

2. The method of claim 1, wherein the step of reflecting the light to the location comprises reflecting the light to the location selected from the group consisting of another substrate or a target.

3. The method of claim 1 wherein the first suppression material and the second suppression material are doped with a second dopant to attenuate transmission of light between the plurality of sections, and wherein the method further comprises:
    attenuating the light between the plurality of sections.

4. A method for managing light, the method comprising:
    sending light from a pumping source onto a front side of a substrate which is configured to increase an intensity of light at a desired wavelength, the substrate comprised of a material configured to attenuate the light passing between through the material, wherein the substrate comprises a plurality of sections including a first suppression material at a number of locations within each section of the plurality of sections, the first suppression material comprises different sizes and shapes at each location of the number of locations, the substrate further comprising an outer edge outside of which is second suppression material, the second suppression material also located between each section of the plurality of sections, each section of the plurality of sections doped with a first dopant to amplify light at the desired wavelength;
    removing heat from a back side of the substrate with a cooling system configured to allow a cooling agent to be transmitted through the cooling system;
    amplifying, by the substrate, the light at a desired wavelength as the light is transmitted through the substrate by transmitting the light through the plurality of sections; and
    reflecting the light to a location.

5. The method of claim 4, wherein the first suppression material and the second suppression material are doped with a second dopant to attenuate transmission of light between the plurality of sections, and wherein the method further comprises:
    attenuating the light between the plurality of sections.

* * * * *